United States Patent
Yu et al.

(10) Patent No.: US 9,823,989 B2
(45) Date of Patent: *Nov. 21, 2017

(54) METHOD AND APPARATUS FOR CONNECTING TO EXTERNAL DEVICE

(71) Applicant: Samsung Electronics Co., Ltd., Gyeonggi-do (KR)

(72) Inventors: Seung-dong Yu, Gyeonggi-do (KR); Woo-yong Chang, Gyeonggi-do (KR); Se-jun Park, Gyeonggi-do (KR); Min-jeong Moon, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/790,363

(22) Filed: Jul. 2, 2015

(65) Prior Publication Data

US 2015/0301918 A1 Oct. 22, 2015

Related U.S. Application Data

(63) Continuation of application No. 14/247,767, filed on Apr. 8, 2014, now Pat. No. 9,086,722, which is a (Continued)

(30) Foreign Application Priority Data

Aug. 21, 2009 (KR) .................. 10-2009-0077872

(51) Int. Cl.
*G06F 3/00* (2006.01)
*G06F 11/30* (2006.01)
(Continued)

(52) U.S. Cl.
CPC ............ *G06F 11/3055* (2013.01); *G06F 3/00* (2013.01); *H04W 76/023* (2013.01); *H04W 76/06* (2013.01)

(58) Field of Classification Search
None
See application file for complete search history.

(56) References Cited

U.S. PATENT DOCUMENTS 7,529,544 B1 * 5/2009 Oh .................. H04W 60/04
455/426.2
7,671,759 B2 * 3/2010 Kuroda .................. G08C 17/02
340/12.54
(Continued)

FOREIGN PATENT DOCUMENTS

CN 1554168 12/2004
CN 1697475 11/2005
(Continued)

OTHER PUBLICATIONS

Chinese Office Action dated Dec. 1, 2015 issued in counterpart application No. 201080036467.1, 7 pages.
(Continued)

Primary Examiner — Elias Mamo
(74) Attorney, Agent, or Firm — The Farrell Law Firm, P.C.

(57) ABSTRACT

An apparatus and method of connecting an external device are provided. The method includes connecting the apparatus to the external device when a distance between the external device and the apparatus is less than a reference range; after the external device is connected to the apparatus, continuously maintaining the connection when a distance between the external device and the apparatus is greater than the reference range; and disconnecting the external device from the apparatus when a distance between the external device and the apparatus is greater than a detectable range.

4 Claims, 7 Drawing Sheets

Related U.S. Application Data continuation of application No. 12/861,602, filed on Aug. 23, 2010, now Pat. No. 8,713,211.

(51) Int. Cl.
*H04W 76/02* (2009.01)
*H04W 76/06* (2009.01)

(56) References Cited

U.S. PATENT DOCUMENTS

| | | | |
|---|---|---|---|
| 2004/0162804 A1 | 8/2004 | Strittmatter et al. | |
| 2004/0203359 A1* | 10/2004 | Sasai | H04W 48/18 455/41.1 |
| 2006/0094462 A1* | 5/2006 | Nguyen | H04W 88/02 455/556.1 |
| 2006/0133325 A1 | 6/2006 | Harris et al. | |
| 2006/0240774 A1 | 10/2006 | Blom et al. | |
| 2007/0149124 A1* | 6/2007 | Onozawa | H04B 5/0062 455/41.2 |
| 2007/0210930 A1 | 9/2007 | Pyo et al. | |
| 2007/0232357 A1* | 10/2007 | Takasu | H04W 4/02 455/558 |
| 2007/0294024 A1 | 12/2007 | Sasaki | |
| 2009/0149125 A1* | 6/2009 | Slotznick | H04M 1/215 455/3.05 |
| 2010/0110949 A1* | 5/2010 | Lundsgaard | H04W 48/16 370/311 |
| 2010/0216436 A1 | 8/2010 | Wijayanathan et al. | |

FOREIGN PATENT DOCUMENTS

| | | |
|---|---|---|
| CN | 1855943 | 11/2006 |
| EP | 1 764 977 | 3/2007 |
| KR | 1020050023551 | 3/2005 |
| KR | 100623381 | 9/2006 |
| KR | 1020060127337 | 12/2006 |
| WO | WO 2007/034457 | 3/2007 |

OTHER PUBLICATIONS

Chinese Office Action dated Jun. 21, 2016 issued in counterpart application No. 201080036467.1, 12 pages.
European Search Report dated Mar. 24, 2016 issued in counterpart application No. 10810213.8-1854, 8 pages.
Chinese Office Action dated Dec. 20, 2016 issued in counterpart application No. 201080036467.1, 11 pages.

* cited by examiner

METHOD AND APPARATUS FOR CONNECTING TO EXTERNAL DEVICE

PRIORITY

This application is a Continuation of U.S. application Ser. No. 14/247,767, filed on Apr. 8, 2014, which is a Continuation of U.S. application Ser. No. 12/861,602, filed on Aug. 23, 2010, and issued as U.S. Pat. No. 8,713,211, which claims priority to Korean Patent Application No. 10-2009-0077872, filed on Aug. 21, 2009, in the Korean Intellectual Property Office, the entire content of each of which is incorporated herein by reference.

BACKGROUND OF THE INVENTION

1. Field of the Invention

The present invention generally relates to a method and apparatus for connecting to an external device, and more particularly, to a method and apparatus for connecting to or disconnecting from a device by using both a distance limit and a time limit.

2. Description of the Related Art

Currently, due to the development of various network and electronic technologies, many Consumer Electric (CE) products that interact with each other during their operations have been created. However, there is still a need for CE products that interact with each other with a greater level of user convenience.

SUMMARY OF THE INVENTION

To solve the above and/or other problems, the present invention provides a method and apparatus for connecting to or disconnecting from a device by using both a distance limit and a time limit.

According to an aspect of the present invention, a method of connecting an external device to an apparatus is provided. The method includes connecting the apparatus to the external device when a distance between the external device and the apparatus is less than a reference range; after the external device is connected to the apparatus, continuously maintaining the connection when a distance between the external device and the apparatus is greater than the reference range; and disconnecting the external device from the apparatus when a distance between the external device and the apparatus is greater than a detectable range.

According to an aspect of the present invention, an apparatus for connecting to an external device is provided. The apparatus includes a communication interface configured to connect the apparatus to the external device when a distance between the external device and the apparatus is less than a reference range; and a controller configured to, after the external device is connected to the apparatus, continuously maintain the connection when a distance between the external device and the apparatus is greater than the reference range, wherein the communication interface is configured to disconnect the external device from the apparatus when a distance between the external device and the apparatus is greater than a detectable range.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

Hereinafter, the present invention will be described in detail by explaining embodiments of the invention with reference to the attached drawings. Like reference numerals in the drawings denote like elements. In the following description of the present invention, a detailed description of known functions and configurations incorporated herein will be omitted for clarity and conciseness.

Figure 1:
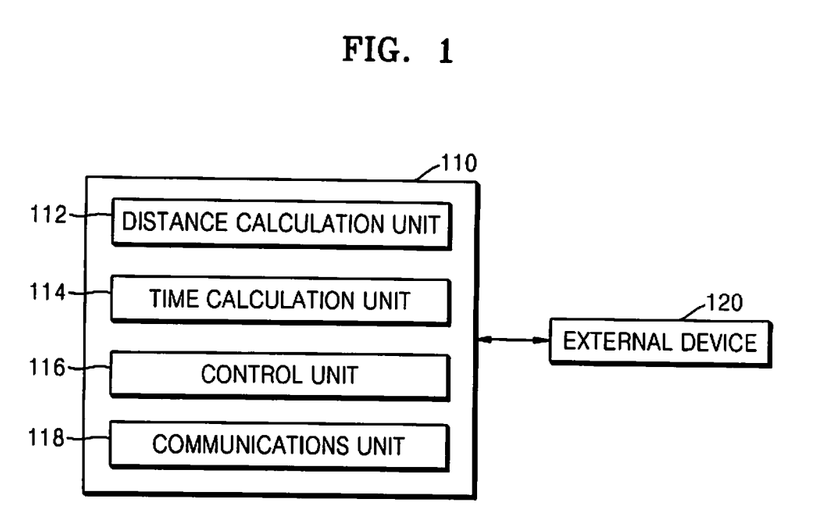
FIG. 1 is a block diagram illustrating an apparatus for connecting to or disconnecting from an external device according to an embodiment of the present invention.

FIG. 1 is a block diagram illustrating an apparatus for connecting to or disconnecting from an external device according to an embodiment of the present invention. The apparatus of FIG. 1 is first described with regards to a case where the apparatus connects to an external device, as follows. Referring to FIG. 1, an external device connection apparatus 110 includes a distance calculation unit 112, a time calculation unit 114, a control unit 116, and a communications unit 118.

The distance calculation unit 112 detects a location of an external device 120 and calculates a separation distance between the external device 120 and the external device connection apparatus 110. When the external device 120 is within a recognizable range of the external device connection apparatus 110, the distance calculation unit 112 may calculate the separation distance. The distance calculation unit 112 calculates the separation distance to be "0" when the external device 120 is in contact with the external device connection apparatus 110. When the separation distance is "0", the external device 120 and the external device connection apparatus 110 may be connected to each other by a predetermined communications network so as to be recognizable by each other. For example, a predetermined sensor or an object identification apparatus such as a Radio Frequency IDentification (RFID) tag is attached to the external device connection apparatus 110. The external device connection apparatus 110 scans for the external device 120 according to a predetermined time interval set by a manufacturer. The distance calculation unit 112 may also be limited to only detecting whether the external device 120 exists within the recognizable range.

The time calculation unit 114 calculates a time during which the external device 120 exists within a reference range of the external device connection apparatus 110 when the calculated separation distance between the external device 120 and the external device connection apparatus 110 is within the reference range. More specifically, the time calculation unit 114 calculates the time starting from a time when the external device 120 is located within the reference range. If the external device 120 travels outside of the reference range, the calculated time is reset. In another embodiment, when the separation distance is considered to be in the reference range only when the external device connection apparatus 110 is in contact with the external device 120, the time calculation unit 114 calculates the time starting from a time when the external device connection apparatus 110 contacts the external device 120. In order to detect the time during which the external device 120 is within the reference range, the external device connection apparatus 110 periodically scans for the external device 120 according to a predetermined time interval set by the manufacturer.

The controller 116 determines whether the time calculated by the time calculation unit 114 exceeds a predetermined critical value. If the calculated time exceeds the predetermined critical value, the external device connection apparatus 110 grants a connection right to the external device 120 via the communications unit 118. When the connection right is granted, the external device connection apparatus 110 and the external device 120 are connected to each other. The external device connection apparatus 110 and the external device 120 may be connected in an ad-hoc or infra connection method. The ad-hoc connection method may directly perform communications between devices without using an access point. The infra connection method may be one of various wireless Local Area Network (LAN) communication methods and may include performing communications between devices via an access point. According to the present embodiment of the present invention, either of the ad-hoc connection method or the infra connection method may be used at any moment.

Once the external device connection apparatus 110 and the external device 120 connected, the connection continues until the connection is removed, even if the separation distance between the external device 120 and the external device connection apparatus 110 is greater than the reference range. When the external device 120 is not portable, the external device connection apparatus 110 may connect with a remote controller (not shown) in order to remotely control the external device 120.

After the external device 120 connects to the external device connection apparatus 110, the external device 120 transmits data (contents) currently displayed on the external device 120 to the external device connection apparatus 110. After receiving the data via the communications unit 118, the control unit 116 displays the received data on a display unit (not shown) of the external device connection apparatus 110. When the external device 120 transmits an application that is currently in operation, the control unit 116 may operate the received application.

The apparatus of FIG. 1 is now described with regards to a case where an apparatus disconnects from an external device. In the present example, it is assumed that the external device connection apparatus 110 and the external device 120 are already in a connected state.

The distance calculation unit 112 detects the location of the external device 120 and calculates a separation distance between the external device connection apparatus 110 and the external device 120. When the external device 120 is within the recognizable range of the external device connection apparatus 110, the distance calculation unit 112 may calculate the separation distance. The distance calculation unit 112 calculates the separation distance to be "0" when the external device 120 is in contact with the external device disconnection apparatus 110.

The time calculation unit 114 calculates a time during which the external device 120 exists within the reference range of the external device connection apparatus 100 starting from a time when the separation distance between the external device 120 and the external device connection apparatus 110 is within the reference range. If the external device 120 travels outside the reference range, a calculated time is reset. According to another embodiment of the present invention, when the separation distance is considered to be in the reference range only when the external device connection apparatus 110 is in contact with the external device 120, the time calculation unit 114 calculates the time starting from when the external device connection apparatus 110 contacts the external device 120.

The controller 116 determines whether the time calculated by the time calculation unit 114 exceeds a predetermined critical value. If the calculated time exceeds a predetermined critical value, the control unit 116 disconnects from the external device 120. Alternatively, the external device connection apparatus 110 grants a disconnection right to the external device 120. Then, the external device connection apparatus 110 is disconnected from the external device 120.

In this case, when the external device 120 is not portable, the external device connection apparatus 110 disconnects from a remote controller (not shown) for remotely controlling the external device 120.

Figure 2:
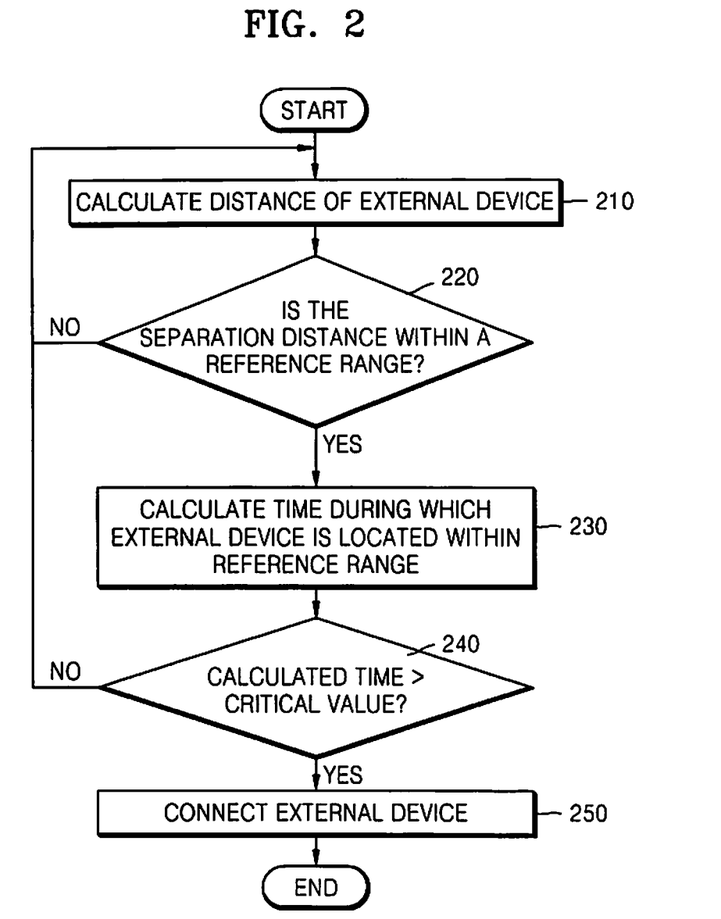
FIG. 2 is a flowchart illustrating a method of connecting to an external device according to an embodiment of the present invention.

FIG. 2 is a flowchart illustrating a method of connecting to an external device according to an embodiment of the present invention. Referring to FIG. 2, in step 210, the distance that the external device is from an external device connection apparatus, i.e., a separation distance, is calculated. When the external device connection apparatus and the external device are in contact with each other, the separation distance is calculated to be "0". In this case, the external device connection apparatus and the external device may be connected via a predetermined communications network so as to be recognizable by each other. For example, a predetermined sensor or an object recognition apparatus such as an RFID tag may be attached to the external device connection apparatus. The external device connection apparatus scans for the external device according to a predetermined time interval, which may be set by a manufacturer.

In step 220, whether the separation distance is within a reference range is determined. When the separation distance is within the reference range, step 230 is performed. When the separation distance is not within the reference range, the operation returns to step 210. The reference range may be determined by the manufacturer. However, a method according to embodiments of the present invention may be performed without calculating the actual separation distance between the external connection apparatus and the external device. When the external device is within a predetermined allowable range from the external device connection apparatus, the external device may be determined to be within the reference range. According to the present embodiment of the present invention, the reference range may be set such that the external device is considered to be within the reference range only when the external device connection apparatus is in contact with the external device.

In step 230, a time during which the external device is located within the reference range is calculated. For example, this time is calculated starting from when the external device connection apparatus is in contact with the external device. To detect the time during which the external device is within the reference range, the external device connection apparatus continues to check for the external device according to a predetermined time interval set by the manufacturer. The predetermined time interval in step 210 may not be the same as the predetermined time interval in step 230.

In step 240, a determination of whether the calculated time exceeds a predetermined critical value. When the time calculated in step 230 exceeds the predetermined critical value, step 250 is performed. If the time calculated in step 230 has not exceeded the predetermined critical value, step 210 is performed. For example, when the external device is moved outside the reference range before a critical time is reached, step 210 is performed. When the external device exists within the reference range until the critical time is reached, step 250 is performed.

In step 250, the external device connects to the external device connection apparatus. The external device connection apparatus and the external device may be connected in an ad-hoc or infra connection method. The ad-hoc connection method allows communications to be directly performed between devices without use of an access point. The infra connection method may be one of various wireless LAN communication methods, and the infra connection method may allow communications to be performed between devices via an access point. According to the present embodiment of the present invention, either of the ad-hoc connection method and the infra connection method may be used at any moment.

After a connection is established between the external device connection apparatus and the external device, even if the external device travels beyond the reference range, the external device connection apparatus and the external device may still remain continuously connected.

Although, according to the method illustrated in FIG. 2, the external device connection apparatus detects the external device in order to connect to the external device, according to other embodiments of the present invention, the same technical characteristics may be applied to an alternate case in which the external device detects the external device connection apparatus in order to connect to the external device connection apparatus.

Figure 3:
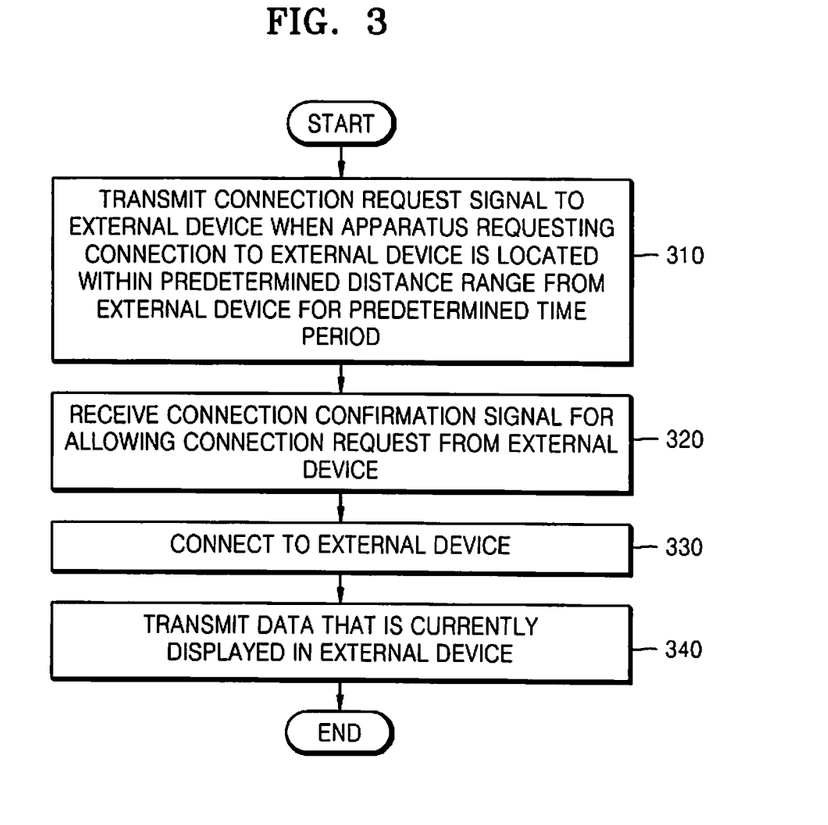
FIG. 3 is a flowchart illustrating a method of connecting an external device to an apparatus that requests a connection, according to an embodiment of the present invention.

FIG. 3 is a flowchart illustrating a method of connecting an external device to an apparatus that requests a connection, according to an embodiment of the present invention. Referring to FIG. 3, in step 310, when the apparatus requesting the connection to the external device is located within a predetermined distance range from the external device for a predetermined time period, the apparatus requesting the connection to the external device transmits a connection request signal to the external device.

In step 320, the apparatus requesting the connection to the external device receives, from the external device, a connection confirmation signal for granting a connection request. More specifically, when the external device confirms the connection request, the apparatus requesting connection receives a connection from the external device.

In step 330, the apparatus requesting the connection to the external device is connected to the external device.

In step 340, the apparatus connected to the external device transmits, to the external device, data that is currently displayed in the apparatus requesting the connection to the external device. For example, when an image or a motion picture is displayed in the apparatus connected to the external device, the data of the image or motion picture displayed by the apparatus connected to the external device is transmitted to the external device. Alternatively, the apparatus connected to the external device may transmit an application being executed in the apparatus requesting connection to the external device to the external device so that the application may be executed in the external device.

Figure 4:
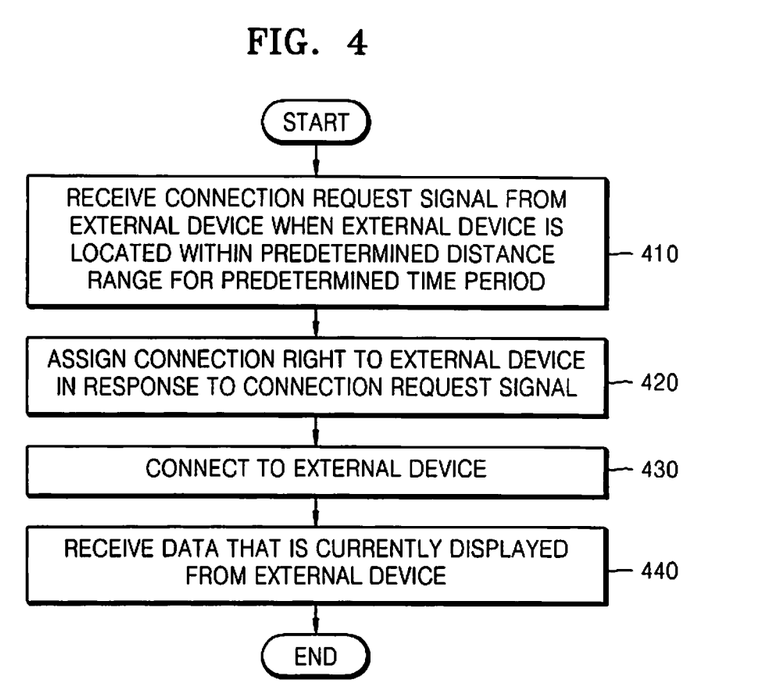
FIG. 4 is a flowchart illustrating a method of connecting an external device to an apparatus that is to receive a connection request, according to an embodiment of the present invention.

FIG. 4 is a flowchart illustrating a method of connecting an external device to an apparatus that is to receive a connection request, according to an embodiment of the present invention. Referring to FIG. 4, in step 410, when the external device is located within a predetermined distance range of the apparatus for a predetermined time period, the apparatus receives a connection request signal from the external device.

In step 420, the apparatus grants a connection right to the external device, in response to the connection request signal of the external device. In step 430, the apparatus connects to the external device. In step 440, the apparatus receives data that is currently displayed by the external device. For example, when an image or a motion picture is displayed in the external device, the apparatus receives the data of the image or motion picture being displayed by the external device. Alternatively, the apparatus may receive an application executed in the external device and may then execute the application.

Figure 5A:
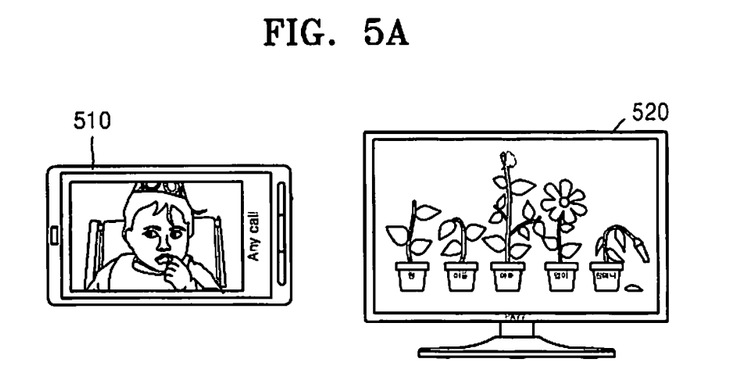
FIGS. 5A-5C are example screen displays of a mobile phone and a television for illustrating an example of the external device connection method of FIG. 2 according to an embodiment of the present invention.
Figure 5B:
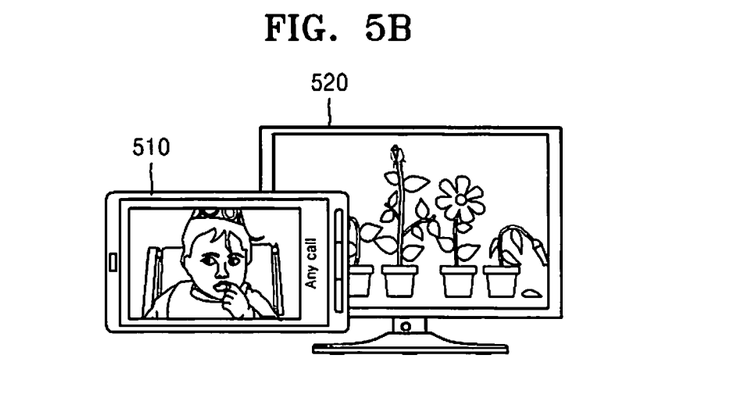
Figure 5C:
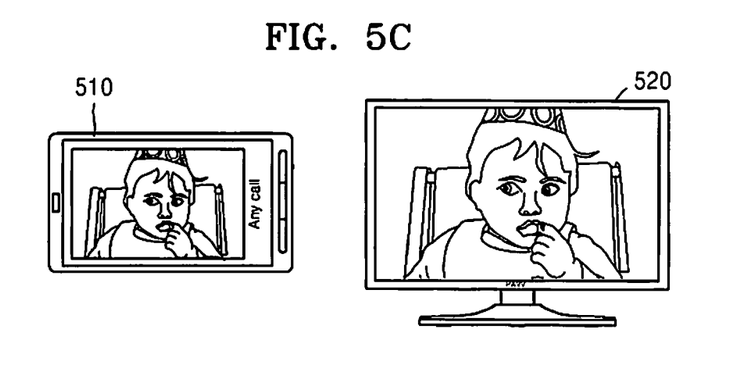

FIGS. 5A-5C are example screen displays of a mobile phone and a television for illustrating an example of the external device connection method of FIG. 2 according to an embodiment of the present invention. Referring to FIG. 5A, the external device, for example, a mobile phone 510, and the external device connection apparatus, for example, a television 520, respectively display different contents. Referring to FIG. 5B, when the mobile phone 510 is located within a predetermined reference range from the television 520 for a predetermined time period, the mobile 510 and the television 520 enter into a connection state. Referring to FIG. 5C, content (data) displayed in the mobile phone 510 is transmitted to the television 520 and thus the content of the mobile phone 510 is displayed in the television 520.

Figure 6:
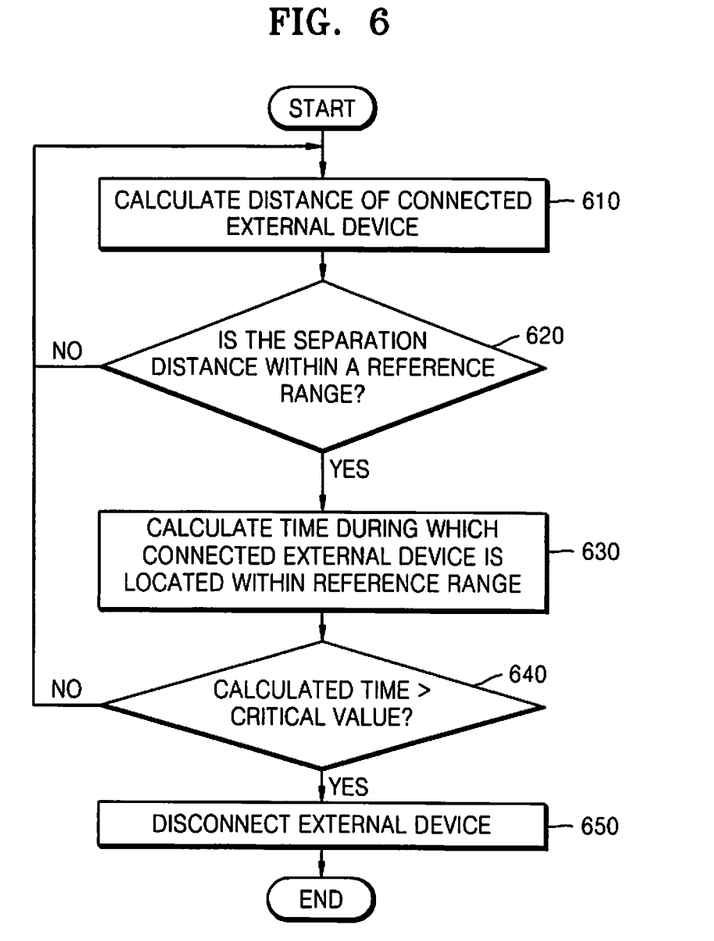
FIG. 6 is a flowchart illustrating a method of disconnecting from an external device according to an embodiment of the present invention.

FIG. 6 is a flowchart illustrating a method of disconnecting an external device according to an embodiment of the present invention. Referring to FIG. 6, in step 610, of the distance between the external device and an external device connection apparatus connected to the external device, that is, a separation distance is calculated. When the external device connection apparatus and the external device are in contact with each other, the separation distance is calculated to be "0".

In step 620, whether the separation distance is within a reference range is determined. When the separation distance is within the reference range, step 630 is performed. However, when the separation distance is greater than the reference range step 610 is performed. According to embodiments of the present embodiment, the reference range may be such that the external device is considered to be in the reference range only when the external device connection apparatus is in contact with the external device.

In step 630, a time during which the connected external device is located within the reference range is calculated. For example, when the external device connection apparatus is in contact with the external device, the time during which the connected external device is located within the reference range is calculated.

In step 640, a determination of whether the calculated time exceeds a predetermined critical value is performed. When the time exceeds the predetermined critical value, step 650 is performed. However, when the time does not exceed the predetermined critical value, step 610 is performed.

In step 650, the external device disconnects from the external device connection apparatus. The reference range, the time critical value, and the time interval of the disconnection method in FIG. 6 are the same as those in FIG. 2.

Figure 7:
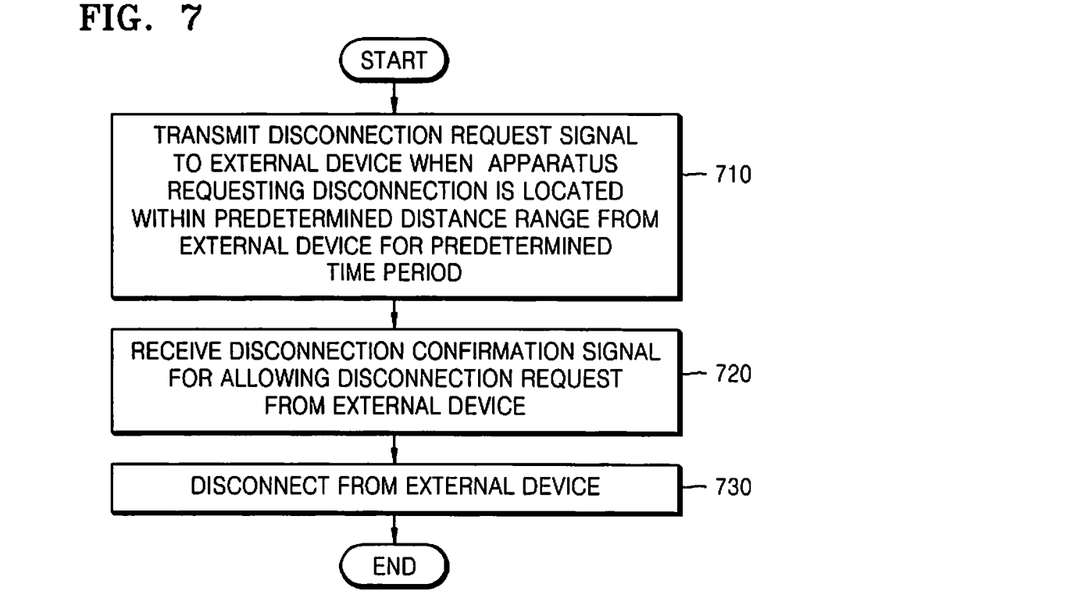
FIG. 7 is a flowchart illustrating a method of disconnecting an external device from an apparatus that requests a disconnection, according to an embodiment of the present invention.

FIG. 7 is a flowchart illustrating a method for disconnecting an external device from an apparatus that requests a disconnection, according to an embodiment of the present invention. Referring to FIG. 7, in step 710, when the apparatus requesting the disconnection is located within a predetermined distance range from the external device for a predetermined time period, the apparatus requesting the disconnection transmits a disconnection request signal to the external device.

In step 720, the apparatus requesting the disconnection receives, from the external device, a disconnection confirmation signal for granting a disconnection request. More specifically, when the external device confirms the disconnection request, the apparatus requesting the disconnection receives a disconnection right from the external device.

In step 730, the apparatus requesting the disconnection is disconnected from the external device.

Figure 8:
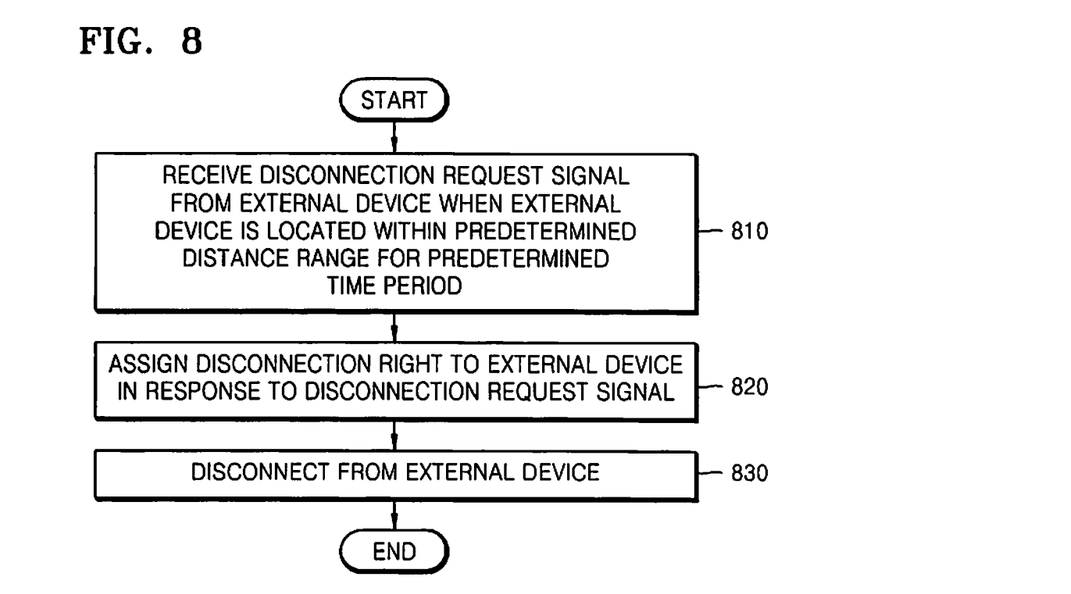
FIG. 8 is a flowchart illustrating a method of disconnecting an external device from an apparatus that is to receive a disconnection request, according to an embodiment of the present invention.

FIG. 8 is a flowchart illustrating a method of disconnecting an external device from an apparatus that is to receive a disconnection request, according to an embodiment of the present invention. Referring to FIG. 8, in step 810, when the external device is located within a predetermined distance range for a predetermined time period, the apparatus receives a disconnection request signal from the external device.

In step 820, the apparatus grants a disconnection right to the external device, in response to the disconnection request signal of the external device. In step 830, the apparatus is disconnected from the external device.

The present invention can also be embodied as computer readable codes on a computer readable recording medium. Computer readable recording mediums are any data storage device that can store data readable by a computer system. Examples of the computer readable recording medium include Read-Only Memory (ROM), Random-Access Memory (RAM), Compact Disc (CD)-ROMs, magnetic tapes, floppy disks, optical data storage devices, etc. The computer readable recording mediums can also be distributed over network coupled computer systems so that the computer readable code is stored and executed in a distributed fashion. Functional programs, codes, and code segments for accomplishing the present invention can be easily construed by programmers skilled in the art to which the present invention pertains.

Although the present invention has been particularly shown and described with reference to embodiments thereof, it will be understood by those skilled in the art that various changes in form and details may be made therein without departing from the spirit and scope of the invention as defined by the appended claims.

What is claimed is:

1. A method of connecting an external device to an apparatus, the method comprising:
   calculating a first time duration during which a distance between the external device and the apparatus is less than a first reference range;
   connecting the apparatus to the external device if the distance between the external device and the apparatus is less than the first reference range for at least a first predetermined duration;
   after the external device is connected to the apparatus, calculating a second time duration during which a distance between the external device and the apparatus is less than a second reference range; and
   disconnecting the external device from the apparatus if the distance between the external device and the apparatus is less than the second reference range for at least a second predetermined duration.

2. The method of claim 1, wherein one of the first reference range and the second reference range is less than a detectable range.

3. An apparatus for connecting to an external device, the apparatus comprising:
   a communication interface configured to connect the apparatus to the external device if a distance between the external device and the apparatus is less than a first reference range for at least a first predetermined duration; and
   a controller configured to calculate a first time duration during which the distance between the external device and the apparatus is less than the first reference range, and, after the external device is connected to the apparatus, calculating a second time duration during which a distance between the external device and the apparatus is less than a second reference range,
   wherein the communication interface is configured to disconnect the external device from the apparatus if the distance between the external device and the apparatus is less than the second reference range for at least a second predetermined duration.

4. The apparatus of claim 3, wherein one of the first reference range and the second reference range is less than a detectable range.

* * * * *